Figure 1:
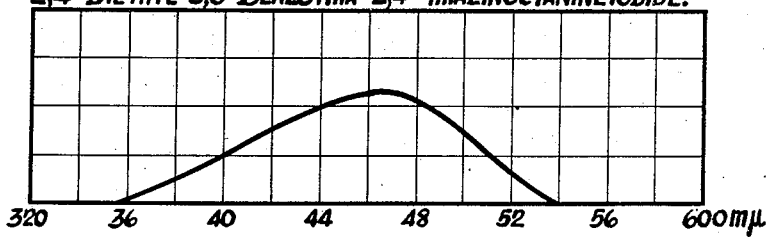

Dec. 24, 1940.   B. BEILENSON   2,226,153

THIAZINOCYANINE DYES

Filed April 21, 1937

2,4'-Diethyl-5,6-Benzothia-2',4'-Thiazinocyanine Iodide.

1',4-Diethyl-2,4-Thiazino-2'-Cyanine Iodide.

2,4'-Diethylthia-2',4'-Thiazinocyanine Iodide.

2,4'-Diethyl-3,4-Benzoxa-2',4'-Thiazinocyanine Iodide.

Bernard Beilenson,
INVENTOR.
BY
ATTORNEYS.

Patented Dec. 24, 1940

2,226,153

UNITED STATES PATENT OFFICE 2,226,153

THIAZINOCYANINE DYES

Bernard Beilenson, Harrow Weald, England, assignor to Eastman Kodak Company, Rochester, N. Y., a corporation of New Jersey Application April 21, 1937, Serial No. 138,158
In Great Britain April 24, 1936

7 Claims. (Cl. 260—240)

This invention relates to new dyes and more particularly to what can be called thiazinocyanine dyes and to photographic emulsions containing the same.

An object of my invention is to provide thiazinocyanine dyes. A further object is to provide a process for the preparation thereof.

A still further object is to provide photographic emulsions containing such dyes. A still further object is to provide photographic emulsions sensitized with such dyes. Other more specific objects will become apparent hereinafter.

My new dyes are derived from either 2,4-benzothiazine (I) or 1,4-benzothiazine (II).

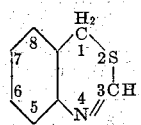

I.

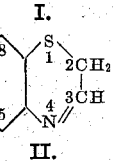

II.

The above names for I. and II. are those employed in Richter's Lexikon. In Chemical abstracts I. is called 2,4,1-benzothiazine and II. is called 1,4,2-benzothiazine. The nomenclature of the dyes of my invention will be based on the Lexikon nomenclature.

My new dyes can be called thiazinopseudocyanine and thiazinoisocyanine dyes and can be represented by the following general formulas:

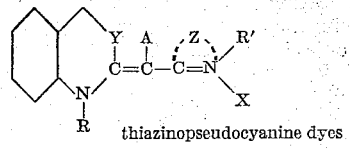
thiazinopseudocyanine dyes and

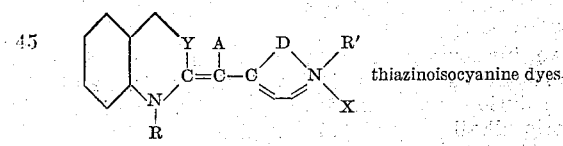
thiazinoisocyanine dyes wherein A represents hydrogen or an organic group, D represents a vinylene or phenylene group, R and R′ represent organic groups, X represents an acid radical, Y represents a —CH$_2$—S— group and Z represents the non-metallic atoms necessary to complete a heterocyclic nucleus. More specifically A can represent an alkyl group, such as methyl, ethyl, or the like, R and R′ can represent alkyl groups, such as methyl, ethyl, n-butyl, decyl, allyl or β-hydroxyethyl for example, X can represent an acid radical, such as halide, alkylsulfate, perchlorate or p-toluenesulfonate for example, Z can represent the non-metallic atoms necessary to complete a heterocyclic nucleus, such as a five-membered heterocyclic nuclei, e. g. one of the oxazole series like benzoxazole, 4-methyloxazole and α- or β-naphthoxazoles; one of the thiazole series like benzothiazole, 5-chlorobenzothiazole, α- or β-naphthothiazoles and 4-phenylthiazole; one of the selenazole series like benzoselenazole, 5-methylbenzoselenazole 4-phenylselenazole; one of the indolenine series like 3,3-dialkyl-indole nines; one of the thiazoline series like 4,5-dihydrothiazole called simply thiazoline or one of the selenazoline series like 4,5-dihydroselenazole called simply selenazoline, or Z can represent the non-metallic atoms necessary to complete a six-membered heterocyclic nucleus, e. g. one of the pyridine series or one of the quinoline series like 5-methylquinoline or 5,6-benzoquinoline (β-naphthoquinoline).

My new dyes can be prepared by condensation of a quaternary salt of a 3-alkylthiol compound of either I. or II. with a cyclammonium quaternary salt containing a reactive alkyl group, particularly a reactive methyl group, in the alpha or gamma position, i. e. one of the so-called reactive positions. The condensation is advantageously effected in the presence of a basic condensing agent. Basic condensing agents, such as sodium or potassium carbonates, sodium ethylate, potassium or sodium hydroxides, organic bases, particularly strong tertiary organic bases, such as triethylamine, tributylamine, triethanolamine or N-methylpiperidine for example, i. e. an organic base having a dissociation constant substantially greater than pyridine. The condensations can be effected in the presene of diluents which are inert toward the reactants. Lower aliphatic alcohols, i. e. an alcohol of from one to four carbon atoms are suitable as diluents, for example. Ethyl alcohol is advantageously employed. One molecular proportion of each, the quaternary salt of the 3-alkylthiol compound and the cyclammonium quaternary salt containing a reactive alkyl group with two molecular proportions of condensing agent are advantageously employed. The temperatures employed are advantageously between 50° C. and 100° C.

Cyclammonium quaternary salts containing a reactive alkyl group can be prepared by heating heterocyclic nitrogen bases containing a reactive alkyl group with esters, such as alkyl halides, particularly alkyl iodides, alkyl sulfates and alkyltoluenesulfonates for example, in a manner well known to those skilled in the art. Quaternary salts of heterocyclic nitrogen bases, such as 1-methylbenzothiazole, μ-methylnaphthothiazoles, 2-methylthiazole, 2,4-dimethylthiazole, 2-methyl-4-phenylthiazole, 2-methyl-4,5-diphenylthiazole,

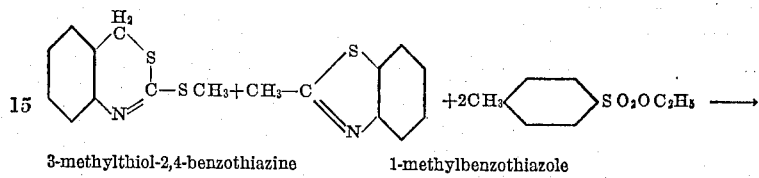

3-methylthiol-2,4-benzothiazine      1-methylbenzothiazole

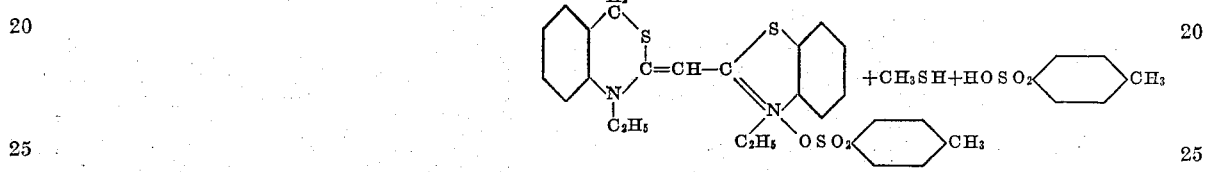

1-methyl-5-chlorobenzothiazole, 1 - methylbenzoxazole, μ-methylnaphthoxazoles, 2,4-dimethyloxazole, 2-methyl-4-phenyloxazole, 1-ethylbenzothiazole, 2,4-dimethylselenazole, 2-methyl-4-phenylselenazole, 2-methylthiazoline, 2-methylselenazoline, 2,3,3-trimethylindolenine, α - picoline, γ-picoline, quinaldine, lepidine and 2-methyl-5,6-benzoquinoline for example, are well known in the art.

Cyclammonium quaternary salts from heterocyclic nitrogen bases containing a reactive alkyl group and halohydrins are described in the copending application of Leslie G. S. Brooker and Lloyd A. Smith, Serial No. 133,524, filed March 29, 1937. Such quaternary salts are advantageously prepared by heating the heterocyclic nitrogen bases with bromohydrins, such as ethylene bromohydrin or propylene bromohydrin, for example. The resulting hydroxyalkyl bromide is advantageously converted to the hydroxyalkyl iodide by treatment with aqueous potassium iodide before employing to prepare my dyes.

Quaternary salts of the 3-alkylthiol compounds of either I. or II. can also be prepared by heating the 3-alkylthiol compound with esters, such as alkyl halides, particularly alkyl iodides, alkyl sulfates and alkyltoluenesulfonates for example.

The following illustrates the formation of quaternary salts of the 3-alkylthiol compounds:

3.6 g. (1 mol.) of 3-methylthiol-2:4-benzthiazine were refluxed with 3.1 c. c. of methyl iodide (4 mols.) on the water bath for several hours and the product left standing for a day. The solid was ether-extracted, and the light brown residue dried. The yield was 1.4 g.

1.95 g. (1 mol.) of 3-methylthiol-2:4-benzthiazine and 0.95 c. c. of methyl sulphate (1 mol.) were heated at 100° for 1½ hours, when a viscous mass was formed. It was washed with ether, but did not crystallise.

I have found it advantageous to prepare my new dyes by reacting the heterocyclic nitrogen bases containing a reactive alkyl group with the 3-alkylthiol compounds and with the esters simultaneously. When employing this procedure, alkyl-p-toluene-sulfonates are advantageously employed. The three reactants, heterocyclic nitrogen base, the 3-alkylthiol compound and the ester, are advantageously heated or fused together. After an initial heating of a few hours, the reaction mass is advantageously dissolved in a suitable solvent, such as a lower aliphatic alcohol, and a basic condensing agent added and the reaction mixture gently refluxed until dye formation is complete. Strong tertiary organic bases are advantageously employed. At least one molecular proportion of basic condensing agent is advantageously employed.

The following illustrates the formation of one of my new dyes:

The 3-alkylthiol compounds are prepared as follows: 3-alkylthiol-2,4-benzothiazines by first preparing o-aminobenzyl alcohol through reduction of anthranilic acid. This is advantageously accomplished by electrolytic reduction as described by Mettler in Berichte der deutschen chemischen Gesellschaft, vol. 38, page 1745 (1905). The o-aminobenzyl alcohol is then converted into 3-thiol-2,4-benzothiazine by treating with alcoholic potassium hydroxide and carbon disulfide. The 3-thiol-2,4-benzothiazine (thiocumothiazone) is then converted into 3-alkylthiol-2,4-benzothiazine by alkylation. These latter two steps are described by Paal and Commerell in Ber. 27, 2430 (1894). The following illustrates the alkylation of 3-thiol-2,4-benzothiazine:

5 g. (1 mol.) of 3-thiol-2:4-benzthiazine were dissolved in 60 c. c. of 10% sodium hydroxide solution and to the filtered solution 6 c. c. (2 mols.) of methyl sulphate were gradually added with vigorous shaking. The reaction was complete in a half-hour, when the solid was filtered off, washed with water and dried by heating at 100° in a vacuum. The yield was 4.9 g.

3-methylthiol-1:4-benzothiazine was prepared through the following stages: o-nitrophenylthioglycollic acid was prepared from o-chloronitrobenzene, thioglycollic acid and potassium hydroxide in alcoholic solution, according to the method of Friedländer and Chwala in Monatsh., 1907, 28, 270, who also describe its reduction with tin and hydrochloric acid to 3-ketodihydro-1:4-benzthiazine,

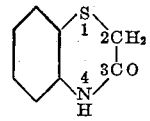

When this compound (7.5 g.) was treated with 4 g. of phosphorus pentasulphide in boiling xylene and the solution so formed extracted with dilute caustic alkali, 3-thiol-1:4-benzothiazine was obtained as the sodium salt and, by the addition of acid, the free base was liberated. Treatment of the sodium salt with methyl sulphate gave 3-methylthiol-1:4-benzothiazine.

The following illustrates the alkylation of 3-thiol-1:4-benzothiazine:

3 g. (1 mol.) of 3-thiol-1:4-benzthiazine were dissolved in 15 c. c. of 5% sodium hydroxide solution, the solution filtered and treated as above with 3 c. c. (more than 2 mols.) of methyl sulphate. An oil separated and was ether-extracted. The oil did not solidify. It weighed 2 g.

While the process of preparing my new dyes is subject to variation, particularly with respect to the nature of the heterocyclic nitrogen base containing the reactive alkyl group, the nature of the alkylthiol compound, the nature of the ester employed to form the quaternary salts, the nature of the condensing agent, the proportions of the reactants and condensing agent, the time of reaction, the temperatures and the method of isolation and purification of the dyes, the following examples will serve to illustrate the mode of preparing my new dyes. These examples are not intended to limit my invention.

EXAMPLE 1.—2,4-diethylthia-2',4'-thiazinocyanine iodide 1.95 g. (1 mol.) of 3-methylthiol-2,4-benzothiazine, 1.49 g. (1 mol.) of 1-methylbenzothiazole and 4.04 g. (2 mols.) of ethyl-p-toluenesulfonate were fused together at 150° C. for about 3 hours. The resulting reaction mass was dissolved in 20 cc. of absolute ethyl alcohol. Dye formation had already taken place, but the reaction was completed by refluxing with 1.38 cc. (1 mol.) of triethylamine for about 5 minutes. The resulting cooled solution was treated with concentrated aqueous potassium iodide and the dye iodide separated from solution. The crude dye iodide was recrystallized from methyl alcohol and obtained as yellow crystals melting at 263° C. Its ethyl alcoholic solution was intensely yellow. The formula of the dye is:

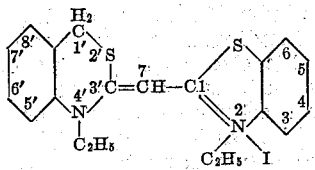

According to the nomenclature for cyanine dyes recently proposed for Beilstein's Handbuch der organischen Chemie, the dye is called [4-ethyl-2,4-benzothiazine-(3)] - [2-ethylbenzothiazole-(1)] methine cyanine iodide.

EXAMPLE 2.—4,1'-diethyl-2,4-thiazino-2'cyanine iodide 1.95 g. (1 mol.) of 3-methylthiol-2,4-benzothiazine, 1.43 g. (1 mol.) of quinaldine and 2 parts of ethyl-p-toluene-sulfonate were treated as in Example 1. The crude dye iodide thus obtained was twice recrystallized from methyl alcohol and obtained as red-yellow crystals melting at 244° C. Its ethyl alcohol solution was strongly yellow-orange. The formula of the dye is:

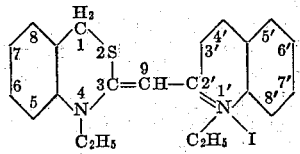

According to the Beilstein nomenclature, it is called [4-ethyl-2,4-benzothiazine-(3)]-[1-ethylquinoline-(2)] methine cyanine iodide.

EXAMPLE 3.—2,4'-diethylselena-2',4'-thiazinocyanine iodide 1.95 g. (1 mol.) of 3-methylthiol-2,4-benzothiazine, 1.96 g. (1 mol.) of 1-methylbenzoselenazole and 4.04 g. (2 mols.) of ethyl-p-toluenesulfonate were fused together at 160° C. for about 3 hours. The reaction mass was dissolved in 20 cc. of ethyl alcohol and the resulting solution treated with an excess of potassium iodide in concentrated aqueous solution. The dye separated from the solution as a yellow solid. It was recrystallized from pyridine and obtained as yellow crystals melting at 271° C. The ethyl alcoholic solution of the dye was intensely yellow. The formula of the dye is:

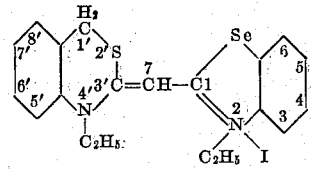

Using the Beilstein nomenclature, it is called [4-ethyl-2,4-benzothiazine-(3)] - [2-ethylbenzoselenazole-(1)] methine cyanine iodide.

EXAMPLE 4.—2,4' - diethyl - 5,6 - benzothia-2'-4'-thiazinocyanine iodide 1.95 g. (1 mol.) of 3-methylthiol-2,4-benzothiazine, 1.99 g. (1 mol.) of 1-methyl-5,6-benzobenzothiazole (1-methyl-α-naphthothiazole) 4.04 g. (2 mols.) of ethyl p-toluenesulfonate were fused together at 160° C. for about 3 hours. The strongly colored melt was dissolved in ethyl alcohol and treated as in the above example to prepare the dye-iodide. The dye-iodide was recrystallized from pyridine and obtained as yellow crystals melting at 274° C. Its ethyl alcoholic solution was strong yellow-orange. The formula of this dye is:

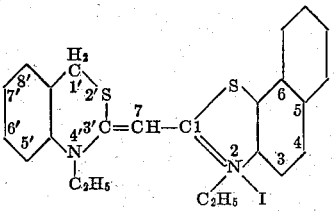

According to the Beilstein nomenclature, this dye is called [4 - ethyl - 2,4 - benzothiazine - (3)]-[2-ethyl-5,6-benzobenzothiazole-(1)] methine cyanine iodide.

EXAMPLE 5.—2,4' - diethyl - 3,4-benzoxa-2',4'-thiazinocyanine iodide 1.95 g. (1 mol.) of 3-methylthiol-2,4-benzothiazine, 1.83 g. (1 mol.) of 1-methyl-3,4-benzobenzoxazole (2-methyl-β-naphthoxazole) 4.04 g. (2 mols.) of ethyl-p-toluenesulfonate were treated in the above example. The so-obtained dye-iodide was recrystallized from methyl alcohol and obtained as pale yellow crystals melting at 249° C. Its ethyl alcoholic solution was clear yellow. The formula for this dye is:

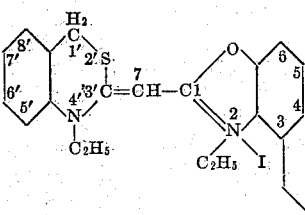

According to the Beilstein nomenclature, this dye is called [4 - ethyl - 2,4 - benzothiazine - (3)]-[2-ethyl-3,4-benzobenzoxazole-(1)] methine cyanine iodide.

EXAMPLE 6.—*3,4'-diethylthiazolino-2',4'-thiazinocyanine iodide*

1.95 g. (1 mol.) of 3-methylthiol-2,4-benzothiazine, 1.01 g. (1 mol.) of 2-methylthiazoline and 4.04 g. (2 mols.) of ethyl-p-toluenesulfonate were treated as in the previous example. The so-obtained dye iodide was recrystallized from methyl alcohol and obtained as pale yellow crystals melting at 226° C. Its ethyl alcoholic solution was pale yellow. The formula for this dye is:

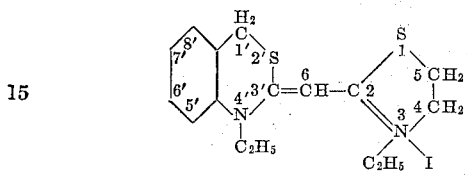

According to the Beilstein nomenclature it can be called [4-ethyl-2,4-benzothiazino-(3)]-[3-ethyl-thiazoline-(2)] methine cyanine iodide.

EXAMPLE 7.—*2,4-dimethylthia-1',4'-thiazinocyanine iodide*

1.95 g. (1 mol.) of 3-methylthiol-1:4-benzthiazine, 1.49 g. (1 mol.) of 1-methylbenzothiazole and 3.72 g. (2 mols.) of methyl p-toluenesulphonate were heated together on the steam bath for 5 hours. The mass was dissolved in 20 c. c. of hot alcohol, and 3 g. of potassium iodide in 5 c. c. of hot water were added to the solution. The solid which separated was water washed and recrystallised from methyl alcohol. Its ethyl alcoholic solution was intensely yellow, and the formula of the dye is presumed to be, from the method of formation:

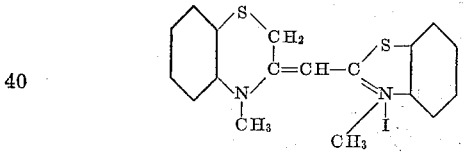

My new thiazinocyanine dyes show a novel sensitizing action in photographic emulsions. My invention is particularly directed to the ordinarily employed gelatino-silver-halide emulsions, and especially to gelatino-silver-chloride emulsions. However, my new dyes can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein described emulsions were prepared employing an ordinary gelatino-silver-chloride emulsion of ordinary concentration.

The methods of incorporating dyes in emulsions are simple and well known to those skilled in the art. In practicing my invention, my new dyes are advantageously added to the emulsion in the form of their solutions in appropriate solvents. The solvent must, of course, be compatible with the emulsion, substantially free from any deleterious effect on the light-sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The concentration of the dye in the emulsion can be varied widely, for example, from about 5 to about 100 mg. of the dyes in about 1000 cc. of flowable emulsion. The suitable and most economical concentration for any given emulsion will be apparent to those skilled in the art upon making the ordinary tests and observations customarily used in the art of emulsion making. The concentration of dye will, of course, vary according to the light-sensitive salt employed, and according to the magnitude of sensitizing effect desired.

To prepare a gelatino-silver-halide emulsion, the following procedure is satisfactory:

A quantity of the dye is dissolved in methyl alcohol, acetone or pyridine and a volume of this solution (which may be diluted with water) containing from 5 to 100 mg. of dye is slowly added to about 1000 cc. of a gelatino-silver-halide emulsion, with stirring. Stirring is advantageously continued until the dye is uniformly dispersed. With the more powerful of my new sensitizing dyes, 10 to 20 mg. of dye per 1000 cc. of emulsion suffice to produce the maximum sensitizing effects with the ordinary gelatino-silver-halide emulsions.

The above statements are only illustrative and are not to be understood as limiting my invention in any sense, as it will be apparent that these dyes can be incorporated by other methods in the photographic emulsions customarily employed in the art, such, for example, as by bathing a plate or film, upon which the emulsion has been coated, in a solution of the dye in an appropriate solvent, although such a method is ordinarily not to be preferred. The claims are intended to cover any combination of these new dyes with a photographic emulsion whereby the dye exerts a sensitizing effect upon the emulsion. The sensitized emulsions of my invention can be converted into a photographic element by coating out onto a support, such as glass, cellulose acetate, cellulose nitrate, other cellulose derivative or resin in a manner well known in the art. The claims are intended to cover such photographic elements.

Figure 2:
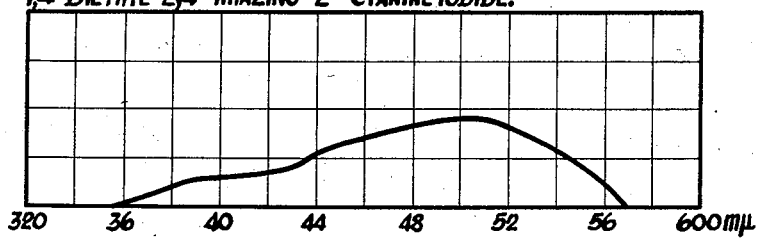
Figure 3:
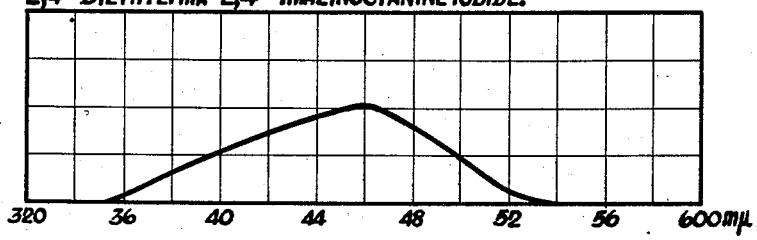
Figure 4:
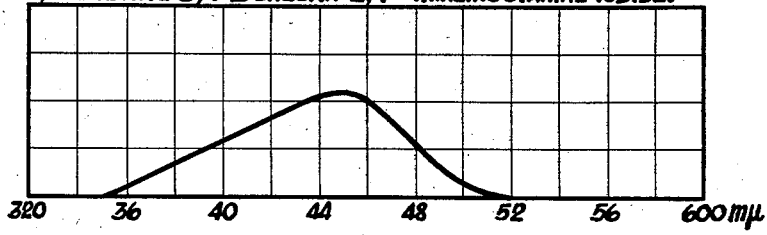

The accompanying drawing is by way of illustration and depicts the sensitizing effect of four of my new dyes. Each figure of the drawing is a diagrammatic reproduction of a spectrogram showing the sensitivity of an emulsion containing one of my new dyes. More specifically, in Fig. 1, the curve represents the sensitivity of an ordinary gelatino-silver-chloride emulsion containing 2,4'-diethyl-5,6-benzothia-2',4'-thiazinocyanine iodide. In Fig. 2, the curve represents the sensitivity of an ordinary gelatino-silver-chloride emulsion containing 1',4-diethyl-2,4-thiazino-2'-cyanine iodide. In Fig. 3, the curve represents the sensitivity of an ordinary gelatino-silver-chloride emulsion containing 2,4'-diethylthia-2',4'-thiazinocyanine iodide. In Fig. 4, the curve represents the sensitivity of an ordinary gelatino-silver-chloride emulsion containing 2,4'-diethyl-3,4-benzoxa-2',4'-thiazinocyanine iodide.

Still further examples showing the application of my invention could be cited, but the foregoing will be sufficient to teach those skilled in the art the manner in which my invention is carried out and the principles of sensitizing photographic emulsions with my new thiazinocyanine dyes.

My new thiazinocyanine dyes are useful in the construction of light filters. They can also be used as coloring matters for textiles, particularly cellulose acetate yarn or the like.

What I claim and desire to be secured by Letters Patent of the United States is:

1. A dye selected from the group consisting of thiazinopseudocyanine dyes and thiazinoisocyanine dyes.
2. A thia-2',4'-thiazinocyanine dye.
3. A 2,4-thiazino-2'-cyanine dye.
4. A benzothia-2',4'-thiazinocyanine dye.
5. A 2,4-diethylthia-2',4'-thiazinocyanine dye.
6. A 4,1'-diethyl-2,4-thiazino-2'-cyanine dye.
7. A 2,4'-diethyl-5,6-benzothia-2',4'-thiazinocyanine dye.

BERNARD BEILENSON.